Dec. 6, 1955 A. F. GALLISTEL 2,725,892
DEVICE FOR FLUSHING PIPE LINE OUTLETS
Filed Sept. 28, 1953
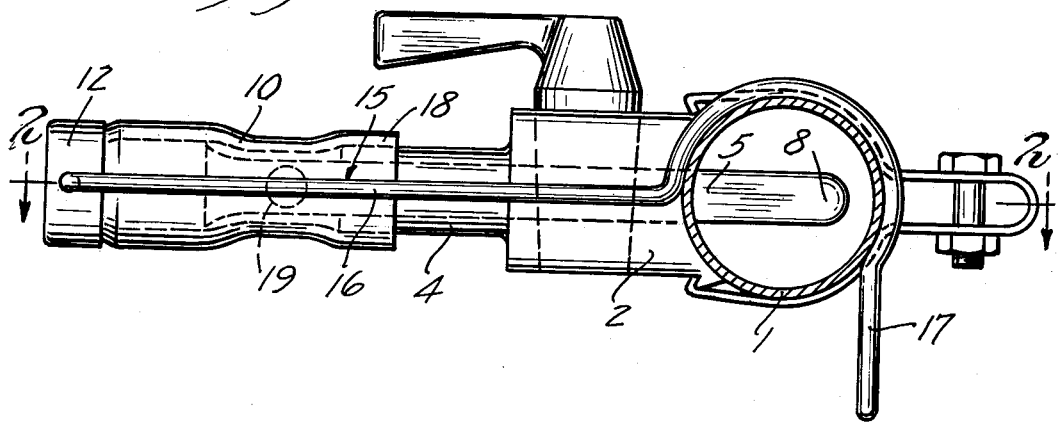
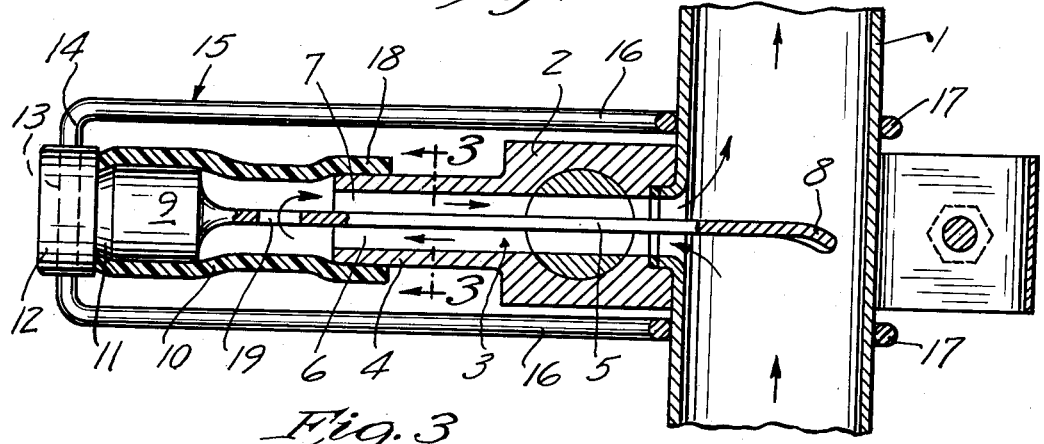
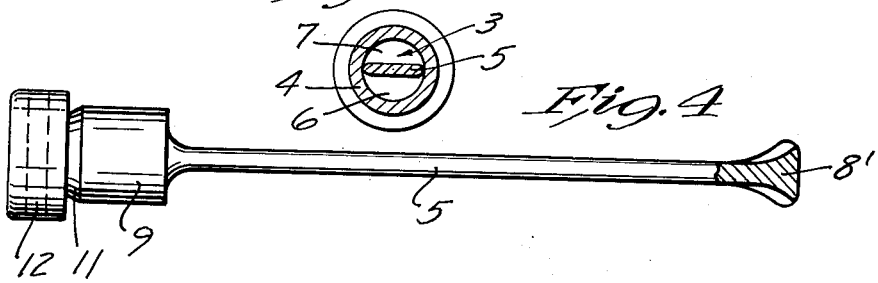
INVENTOR.
Albert F. Gallistel
BY
Merchant & Merchant
ATTORNEYS

United States Patent Office 2,725,892
Patented Dec. 6, 1955

2,725,892

DEVICE FOR FLUSHING PIPE LINE OUTLETS

Albert F. Gallistel, Minneapolis, Minn., assignor to Perfection Manufacturing Corporation, Minneapolis, Minn., a corporation of Minnesota Application September 28, 1953, Serial No. 382,779

3 Claims. (Cl. 137—241)

My invention relates to devices for flushing the stub outlets of pipe lines such as provide branch connectors for milking system pipe lines.

In such milking systems a stub branch connector, generally provided with a valve, is provided adjacent each stall. The individual milkers are attached to each of the branch connectors during the milking operation. Thereafter the milkers are removed and it becomes necessary to thoroughly sanitize by forced flushing not only the pipe lines but the branch connectors as well.

The primary object of my invention is the provision of a device which may be readily detachably secured to the several stub branch connections, whereby said branch connections may be thoroughly flushed and cleansed simultaneously with the pipe lines.

A still further object of my invention is the provision of a device of the class described which is relatively inexpensive to produce, is light in weight, has a minimum of working parts, and is extremely durable.

A still further object of my invention is the provision of a device of the class described which is positive and completely thorough in its operation.

The above and still further objects of my invention will become apparent from the following detailed specification, appended claims, and attached drawings.

Referring to the drawings, wherein like characters indicate like parts throughout the several views:

Fig. 1 is a view partly in side elevation and partly in transverse section of my novel device in operative position;

Fig. 2 is a view partly in section and partly in plan, some parts being broken away, as seen from the line 2—2 of Fig. 1;

Fig. 3 is a transverse sectional view taken on the line 3—3 of Fig. 2; and

Fig. 4 is a view in plan of a modified form of a baffle utilizable in my novel arrangement, a part thereof being broken away.

Referring with greater particularity to the drawings, the numeral 1 indicates a conventional pipe line of the type found in sanitary milk pipe line systems. Pipe line 1 is provided with a stub outlet or branch connector 2 shown as being of the type disclosed and claimed in my copending application Ser. No. 357,301, filed May 25, 1953, and entitled "Branch Connection for Metallic Pipe Lines and Method of Applying Same." However, insofar as my present invention is concerned, I wish it to be specifically understood that same is utilizable on any particular branch connector having a straight through passage 3 to the interior of the pipe line 1.

After the milking operation has been completed, the operator removes the rubber tube leading from the milker from the reduced end 4 of the branch connector 2, and my novel device is inserted for the purpose of flushing simultaneously with the pipe 1. My novel device comprises an elongated relatively flat baffle 5 which, as shown by Fig. 3, has a transverse width only slightly less than the internal diameter of the passage 3 in the branch connector 2. Hence, when the baffle 5 is inserted into the passage 3 of the connector 2, the passage 3 is divided into a pair of parallel passages 6 and 7. As shown, the length of the baffle 5 is sufficiently greater than that of the branch connector 2 so that the inner end 8 thereof projets transversely into the pipe 1. Also, preferably and as shown, the inner end 8 is made spoon-shaped so as to more positively divert flushing fluid passing through the tube 1, in the direction of the arrow, into the passage 6.

At its outer end the baffle 5 is provided with an enlarged head 9 which is preferably cylindrical in shape so as to receive one end of a rubber-like tubular cap 10, which is stretched thereover. Preferably and as shown, the head 9 is recessed at 11 to more readily retain the tubular cap 10 in position thereon. The extreme outer end 12 of the head 9 is provided with a transverse aperture 13 through which loosely projects the closed end 14 of a U-shaped hook member 15. The legs 16 of the U-shaped hook 15 may be swung in a plane parallel with the baffle 5 to and from locking engagement of their hook-forming free ends 17 with the pipe 1 on opposite sides of the connector 2. It will be noted that when the hook 15 is in operative position the inner end 18 of the tubular cap 10 is retained in position stretched about the outer end of the connector 2, whereby to provide a fluid tight seal. Under such circumstances, the flushing fluid entering the passage 3 passes through a transverse opening 19 in the baffle 5 intermediate the outer end of the connector 2 and the head 9, see arrow, and thereafter, as also indicated by arrows, passes through passage 7 back into pipe 1. In this manner, the branch connection 2 is flushed simultaneously with the pipe 1, and in order to assure complete sterility of the connector 2 for the next milking operation, my novel structure may be retained in operative position, to be removed immediately prior to inserting of the milk tube over the open end of the branch connector 2.

In Fig. 4, I have shown a modified form of a baffle, wherein the inner end 8' is flared in opposite directions whereby to divert fluid flowing in either direction through the pipe 1 into the passages 6 and 7 formed thereby when in operative position within the passage 3 of the branch connector 2.

My device has been throughly tested and found to be completely satisfactory for the accomplishment of the above objects, and while I have shown a preferred and one modified form thereof, I wish it to be specifically understood that same is capable of further modification without departure from the scope of the appended claims.

What I claim is:

1. A flushing device for angularly disposed stub pipe line outlets comprising a relatively flat baffle element having a length greater than said stub outlet and a transverse width only slightly less than the internal diameter of said outlet, whereby when said baffle element is placed within said outlet it divides same into two elongated passages, said baffle element having a free inner end which is adapted to project transversely into said pipe and an enlarged head at its outer end in spaced relation to the outer end of said outlet, a tubular elastic cap element carried by said head, said cap element projecting axially inwardly over the outer portion of said baffle element and adapted to make fluid-tight engagement with the outer end of said outlet, one of said elements defining fluid passage means connecting the outer ends of the two elongated passages, and hook means associated with said head for detachably coupling same to said pipe line.

2. A flushing device for angularly disposed stub pipe line outlets comprising a relatively flat baffle element having a length greater than said stub outlet and a transverse width only slightly less than the internal diameter of said outlet, whereby when said baffle element is placed within said outlet it divides same into two elongated passages, said baffle having a free inner end which is adapted to project transversely into said pipe line, the outer end of said baffle element terminating in an enlarged head in spaced relation to the outer end of said outlet, said baffle element having a fluid passage therethrough intermediate said head and the outer end of said outlet, a tubular elastic cap carried by said head, said cap encompassing the outer end portion of said baffle element and projecting longitudinally inwardly beyond said passage and adapted to have fluid tight telescopic engagement at its inner end portion with the outer end of said outlet, and hook means associated with said head for detachably coupling the same to said pipe line.

3. The structure defined in claim 2 in which said hook means comprises a generally U-shaped member having its intermediate portion projecting loosely through a transverse opening in said head for swinging movements of said member in a plane parallel to said baffle element, the legs of said U-shaped member terminating in resilient hook elements partially encompassing said pipe line at opposite sides of said stub pipe line outlet to anchor said baffle element against longitudinal movement.

References Cited in the file of this patent
UNITED STATES PATENTS

| | | |
|---|---|---|
| 186,411 | Church | Jan. 23, 1877 |
| 339,206 | Phelan | Apr. 6, 1886 |
| 1,037,224 | Ermentrout | Sept. 3, 1912 |
| 1,541,987 | Mascall | June 16, 1925 |
| 2,113,203 | Straubel | Apr. 5, 1938 |
| 2,563,968 | Simmons | Aug. 14, 1951 |